US011982279B2

(12) United States Patent
Malone

(10) Patent No.: US 11,982,279 B2
(45) Date of Patent: May 14, 2024

(54) PUMP WITH ROTARY VALVE

(71) Applicant: COOPER-STANDARD AUTOMOTIVE, INC., Northville, MI (US)

(72) Inventor: David S. Malone, Attica, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 86 days.

(21) Appl. No.: 17/586,142

(22) Filed: Jan. 27, 2022

(65) Prior Publication Data

US 2023/0235739 A1 Jul. 27, 2023

(51) Int. Cl.

*F04D 15/00* (2006.01)
*F04D 13/06* (2006.01)
*F04D 29/02* (2006.01)
*F04D 29/48* (2006.01)

(52) U.S. Cl.

CPC ..... *F04D 15/0016* (2013.01); *F04D 13/0606* (2013.01); *F04D 15/0066* (2013.01); *F04D 29/026* (2013.01); *F04D 29/486* (2013.01); *F05D 2250/52* (2013.01); *F05D 2300/501* (2013.01)

(58) Field of Classification Search

CPC ............. F04D 15/0005; F04D 15/0016; F04D 15/0022; F04D 27/002; F04D 27/005; F04D 29/4293; F04D 29/466; F04D 29/468

See application file for complete search history.

(56) References Cited

U.S. PATENT DOCUMENTS

| | | | |
|---|---|---|---|
| 4,679,983 A | 7/1987 | Pietryk et al. | |
| 4,979,983 A * | 12/1990 | Nishikawa ................ | C21C 7/10 75/511 |
| 7,240,682 B2 | 7/2007 | Jenkins et al. | |
| 10,570,921 B2 * | 2/2020 | Geffert ................ | F04D 29/4293 |
| 2004/0173249 A1 * | 9/2004 | Assmann ............ | F16K 15/1848 134/179 |
| 2012/0114473 A1 | 5/2012 | Badafem et al. | |
| 2021/0003133 A1 | 1/2021 | Blad et al. | |

FOREIGN PATENT DOCUMENTS

| | | | |
|---|---|---|---|
| DE | 102017208134 A1 * | 11/2018 | ........... F04D 13/028 |
| EP | 1403521 A1 | 3/2004 | |
| WO | WO-2009070565 A1 * | 6/2009 | ......... F04D 15/0016 |

OTHER PUBLICATIONS

SLB, "How It Works: Gears", Jan. 2, 2015 (Year: 2015).*
Search Report and Written Opinion for PCT/US2022/050955 dated Apr. 14, 2023.

* cited by examiner

*Primary Examiner* — Courtney D Heinle
*Assistant Examiner* — Andrew J Marien
(74) *Attorney, Agent, or Firm* — Paschall & Associates, LLC; James C. Paschall; Anthony Miologos

(57) ABSTRACT

A pump assembly is disclosed comprising, a pump including a pump housing having a fluid inlet. At least one fluid outlet extends from the pump housing. An impeller driven by a motor is mounted in the pump housing arranged to move a fluid from the fluid inlet to the at least one fluid outlet. A valve rotatably mounted between the impeller and the at least one fluid outlet selectively controls the flow of fluid through the at least one fluid outlet.

20 Claims, 7 Drawing Sheets

PUMP WITH ROTARY VALVE

TECHNICAL FIELD

This disclosure is generally directed to pumps. More specifically, it relates to a pump having an integrated valve that facilitates control of flow from the pump.

BACKGROUND

Pumps are known and commonly used to move fluids, such as coolant in a vehicle. One example is cooling systems with water pumps, which are used for the cooling of different electrical components of the vehicle. These are hybrid or purely electric vehicles since vehicles with internal combustion engines do not comprise any electrical components that need to be cooled. Valves are used to ensure the distribution of the coolant throughout the cooling system. The valves each require an actuator with electrical control and a holder on a component of the vehicle, which results in high component costs. Therefore, it is an object of the present disclosure to provide a pump with an integrated valve that can control the flow from the pump through a plurality of outlets using a minimal set of components.

SUMMARY

This disclosure relates to a pump having an integrated valve that facilitates control of flow from the pump.

In a first embodiment a pump assembly is disclosed comprising, a pump including a pump housing having a fluid inlet. At least one fluid outlet extends from the pump housing. An impeller driven by a motor is mounted in the pump housing arranged to move a fluid from the fluid inlet to the at least one fluid outlet. A valve rotatably mounted between the impeller and the at least one fluid outlet selectively controls the flow of fluid through the at least one fluid outlet.

In a second embodiment method of controlling a pump assembly is disclosed that includes a pump including a pump housing having a fluid inlet and at least one fluid outlet extending from the pump housing, the method comprising moving a fluid from the fluid inlet to the at least one fluid outlet using an impeller that is driven by a motor. The method further including selectively moving a valve rotatably mounted between the impeller and the at least one fluid outlet to control the flow of fluid through the at least one fluid outlet.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

An example pump assembly comprises a pump including a housing having an inlet, at least one outlet and an impeller for moving a fluid from the inlet to the outlet. A pump motor drives the impeller to move the fluid, and a rotary valve between the impeller and the outlet selectively controls the flow of fluid through the outlet.

Figure 1:
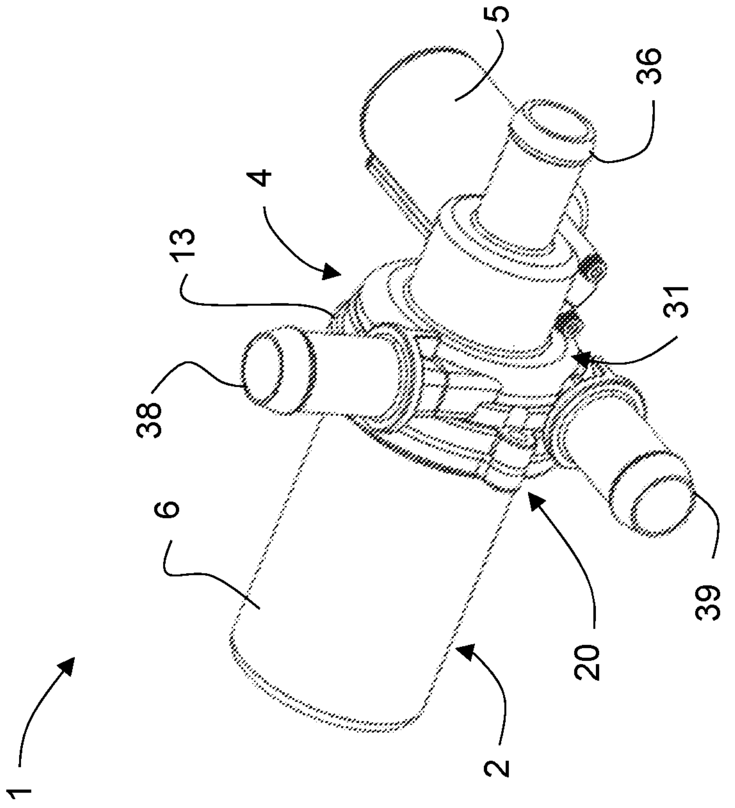
FIG. 1 illustrates a perspective view of an assembled pump assembly of the present disclosure.

FIG. 1 illustrates an example pump assembly 1 for pumping a fluid, such as a coolant, in a vehicle. As can be appreciated, the pump assembly 1 may also be used in non-vehicle applications. The example pump assembly 1 is an integration of a pump and a valve for selectively controlling flow from the pump assembly 1.

Figure 2:
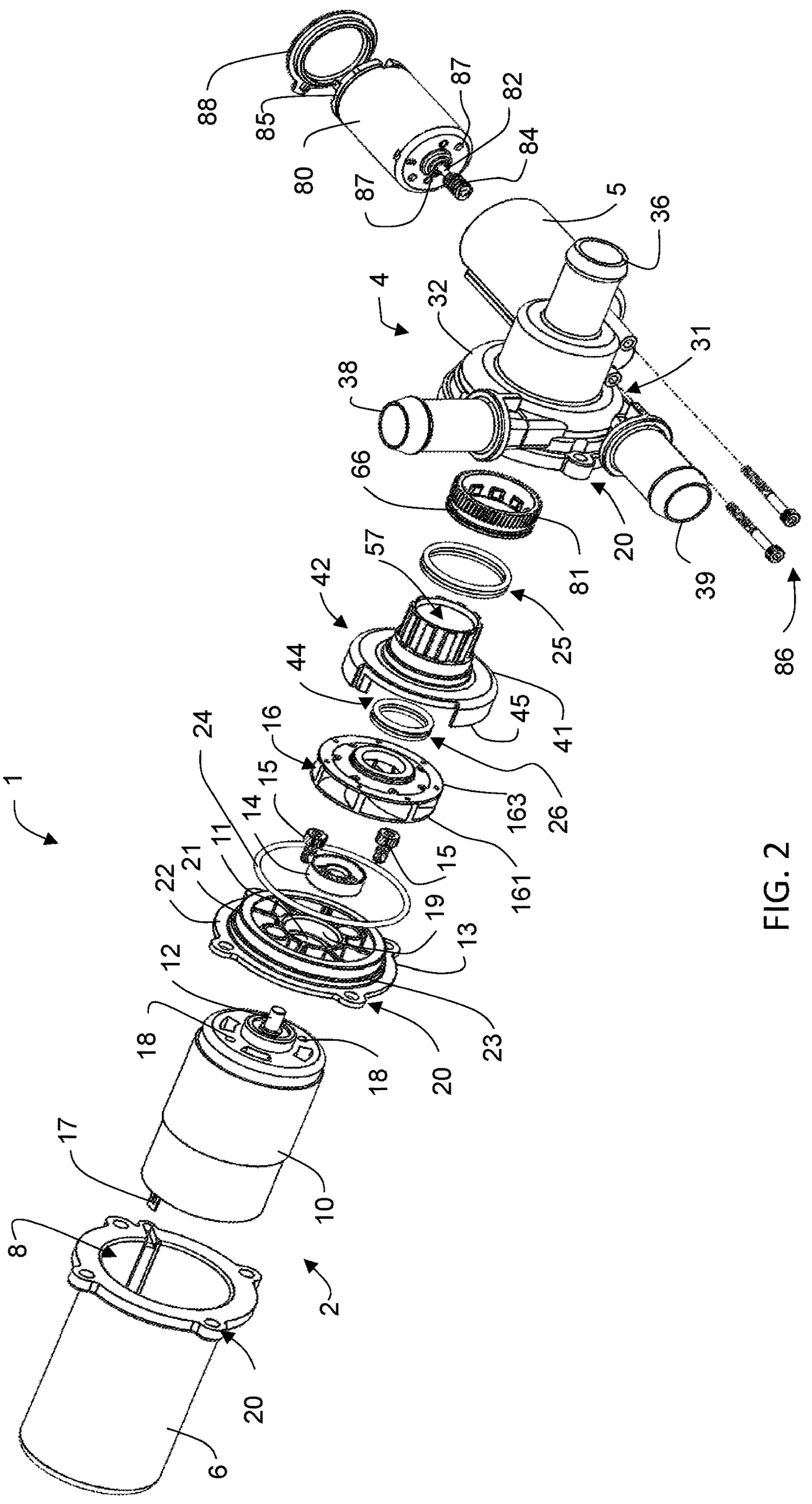
FIG. 2 illustrates an exploded view of the pump assembly of the present disclosure.
Figure 3:
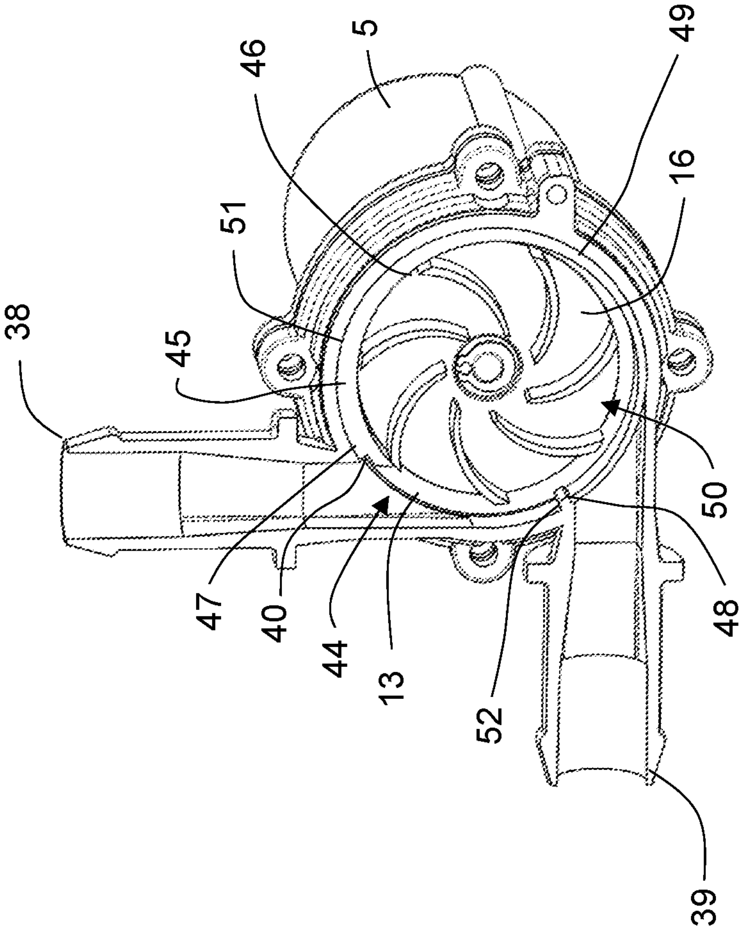
FIG. 3 illustrates a cross-sectional perspective view of a portion of the pump section of the present disclosure.

Referring back to FIG. 1 and also to FIG. 2, the pump assembly 1 includes a pump motor section 2 and a pump section 4. The pump motor section 2 includes a motor housing 6 that forms a motor cavity 8 therein. The pump motor housing 6 supports a pump motor 10 and a motor shaft 12 is installed through opening 11 of a pump motor mounting plate 13. The mounting plate 13 includes a wall 21 extending circumferentially from a first surface 22 of the mounting plate 13. The wall 21 includes a groove 23 extending along and outer periphery of wall section 21. An elastomeric sealing element, such as for example an O-ring 24 is arranged to be installed in groove 23. A seal member 14 is installed within a seal seat 19 molded on mounting plate 13. The impeller 16 includes a first vane plate 161 and a second vane plate 163 housing a plurality of impeller vanes therebetween. The impeller 16 is configured to be rotatable within the pump section 4 driven by the motor shaft 12. The pump motor 10 includes electrical connections 17 that extend from a rear portion of the motor 10 through a rear portion of motor housing 6. The electrical connections 17 adapted to receive electrical power from a remotely located power source to energize and operate the pump motor 10.

The mounting plate 13 is secured to the pump motor 10, in this example, using threaded fasteners 15 that extend through holes in the mounting plate 13 to engage threaded holes 18 on the face of pump motor 10. With the mounting plate 13 mounted on the pump motor 10 mounting tabs 20 located about the motor housing 6, the mounting plate 13 and the pump housing 31 are brought together and the wall 21 installed within an interior surface of pump housing 31. The O-ring 24 sealing against the interior surface of the pump housing 31 and wall 21. The mounting tabs 20 are aligned with each other to assemble and secure the motor section 2 to the pump section 4 using suitable fasteners (not shown). As can be appreciated, other types of fastening devices or techniques may be used to secure the pump section 4 and the motor section 2 together.

In the illustrated example of FIG. 2, the pump housing 31 of pump section 4 is formed essentially cylindrically and comprises a peripheral exterior wall 32. A fluid inlet 36, for example a suction inlet for sucking in a fluid, in this example a coolant, is positioned centrally to the rotary axis of the pump housing 31. The pump housing 31 also includes at least one fluid outlet for discharging fluid from the pump section 4. In this embodiment, two fluid outlets 38, 39 are shown. A first fluid outlet 38, and a second fluid outlet 39 extend from the wall 32 and are axially offset from each other such that the centers of the fluid outlets 38, 39, in the example, are oriented 90 degrees from the other. It will be appreciated by those skilled in the an, that fluid outlets 38, 39 may be offset from each other at any other convenient angle. The fluid outlets 38, 39 are fluidly connected to a pump cavity 50.

Referring to FIGS. 2-5, an adjustable valve member 42 is radially located outside the impeller 16 and inside the pump cavity 50. The valve member 42 is arranged to adjustably direct the fluid through the respective fluid outlets 38, 39. The valve member 42 is comprised of an annular valve element 41 having a wall 45 with an exterior wall surface 49 and an interior wall surface 46 and a rectangular opening 44 extending through wall 45. In this example, wall 45 of the valve element 41 is spirally voluted from a generally thicker wall section at a first end 47 of opening 44 to a generally thinner wall section at a second end 48 of the opening 44. The impeller 16 is arranged to rotate inside the annular valve element 41 and the voluted interior wall surface 46. The pump housing 31 includes a stop member 52 extending into cavity 50. The valve element 41 further includes a stop surface 40 located at first end 47 of opening 44.

Figure 5:
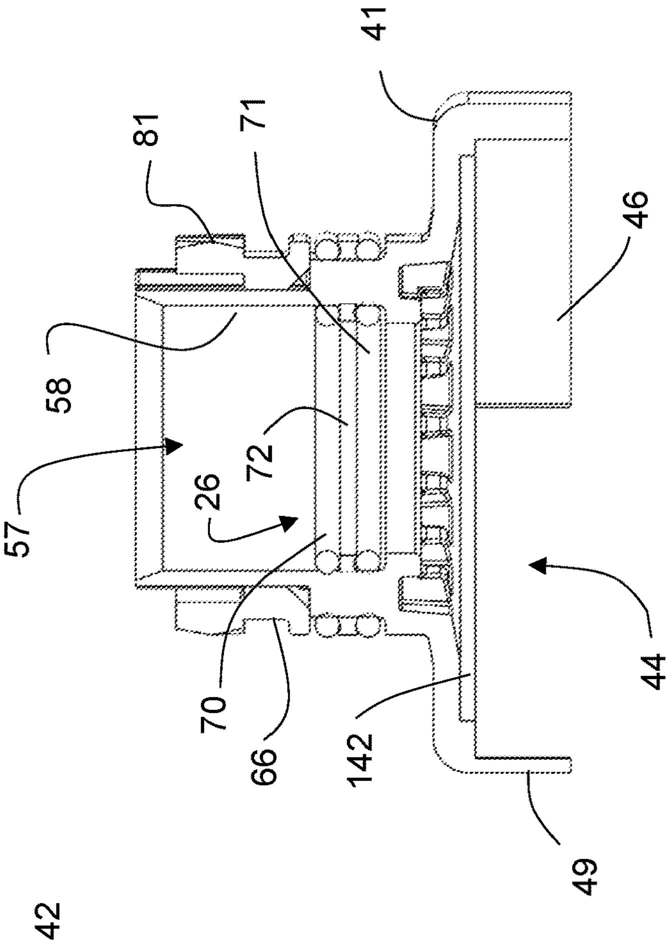
FIG. 5 illustrates a cross-sectional view through the valve member of the present disclosure.
Figure 4:
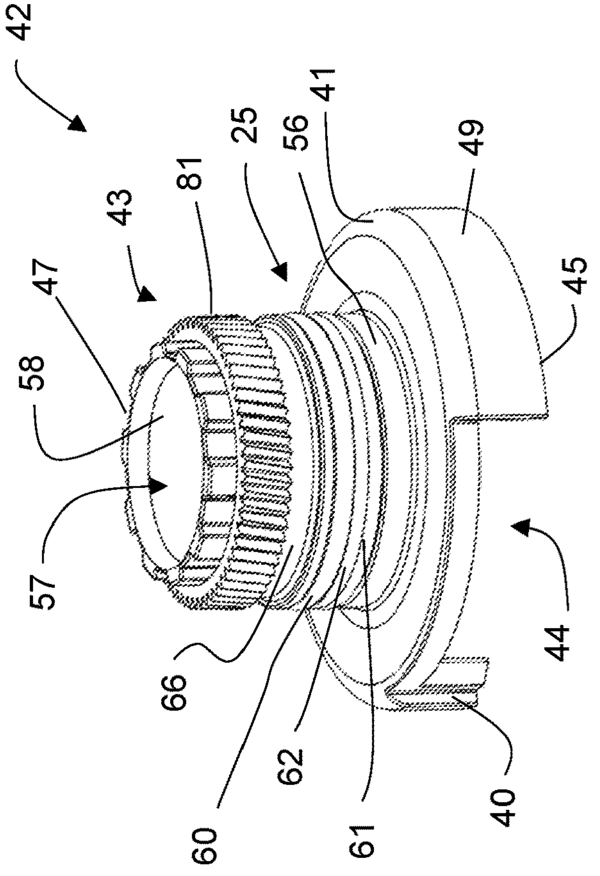
FIG. 4 illustrates a perspective view of the valve member of the present disclosure.

FIGS. 4 and 5 illustrate the example valve member 42 isolated from pump housing 31. The example varve member 42 of the present disclosure includes a cylindrical inlet member 47 located at upper section 43 of valve member 42. The upper section 43 of the valve member 42 further includes an annular outer surface 56 and an internal passage 57 enclosed by an annular interior surface 58. The outer surface 56 of upper section 43 includes an exterior sealing assembly 25 consisting of first and second elastomeric sealing members 60, 61 separated by a spacer 62. The exterior sealing assembly 25 is located circumferentially about the perimeter of outer surface 56. The passage 57 further includes an interior sealing assembly 26 consisting of third and fourth sealing members 70, 71 separated by spacer 72, as is shown at FIG. 5. The interior sealing assembly 26 is located parallel with and directly opposite from the exterior sealing assembly 25. The exterior and interior sealing assemblies are used to provide a fluid tight seal between the valve member 42 and the pump housing 31.

Figure 8:
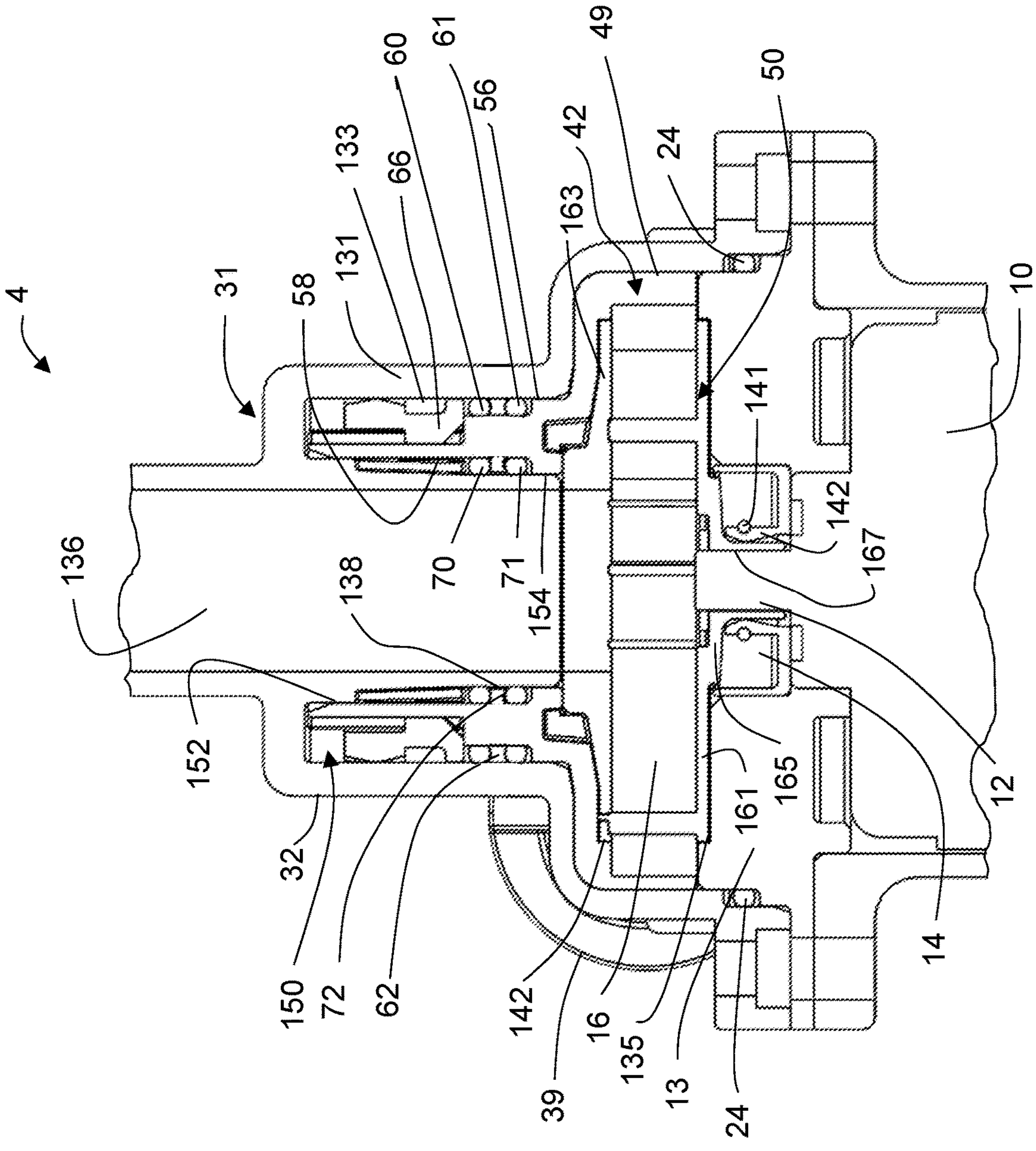
FIG. 8 illustrates a cross-sectional view through a portion of the assembled pump assembly of the present disclosure.

As is shown in FIG. 8, the upper section 43 of the valve member 42 is arranged to be assembled within an annular mounting cavity 150 formed in the interior of pump housing 31. The internal passage 57 receives a tubular portion 136 of fluid inlet 36 that directs fluid at low pressure to the impeller 16. The first and second sealing members 60, 61 seal against an interior surface 133 of mounting cavity 150. The third and fourth sealing members 70, 71 seal against surface 138 of the mounting cavity 150. Sealing members 60, 61 and 70, 71 are comprised of, for example, of O-rings fabricated from an elastomeric material such as Ethylene Propylene Diene Monomers (EPDM) rubber or the like.

Figure 6:
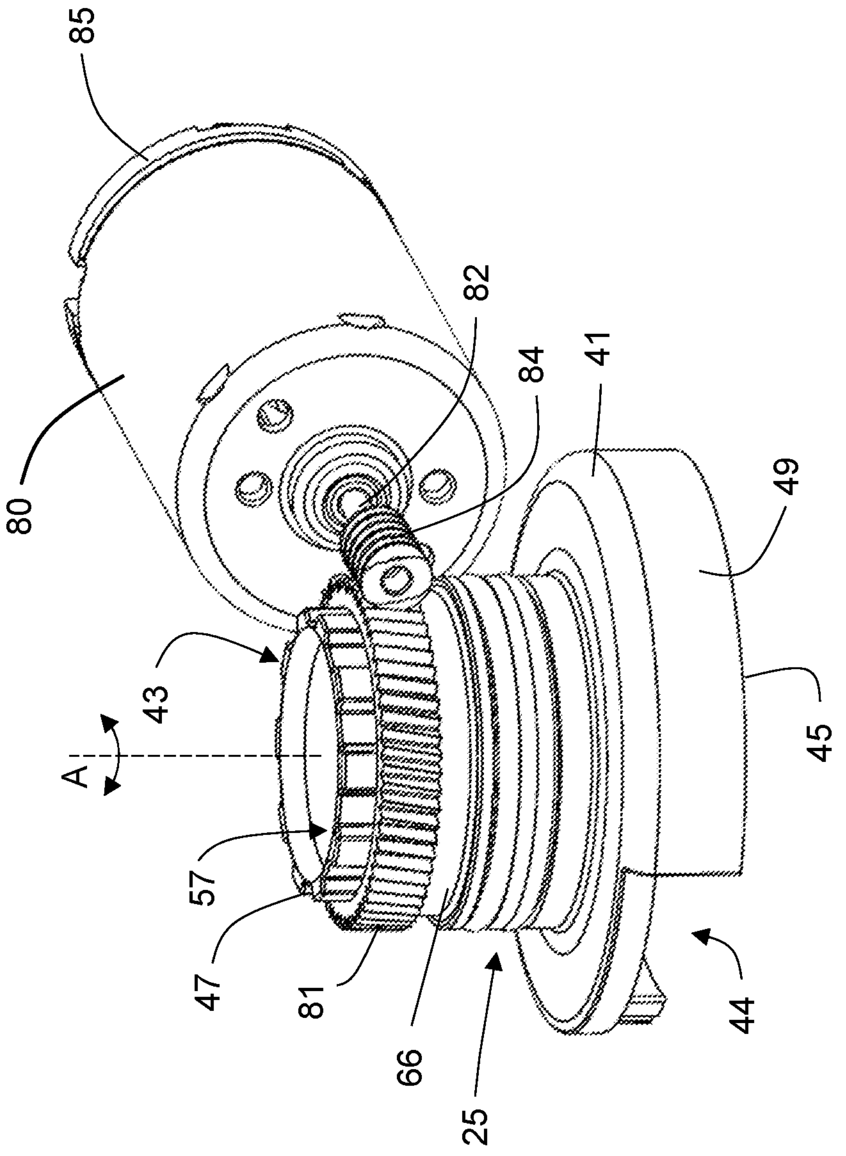
FIG. 6 illustrates a perspective view of the assembly of the valve member and actuator motor of the present disclosure.

With renewed reference to FIGS. 4 and 5, the upper section 43 of the valve member 42 further includes an actuation ring 66 having a spline tooth gear band 81 attached about the periphery of the outer surface 56. As is shown in FIG. 6 the teeth of the gear band 81 are arranged to be mechanically connected to a worm gear member 84 attached to a shaft 82 of an actuator motor 80. The valve member 42 is rotatable about a central axis A to adjust the fluid flow from the pump cavity 50 to fluid outlets 38, 39, which will be explained in more detail below. In this regard, the valve member 42 may be considered to be a rotary valve.

With reference to FIGS. 1 and 6, the actuator motor 80 of the present disclosure is arranged to be housed within an actuator motor housing 5 of the pump section 4. The actuator motor housing 5 is integrally formed with the pump housing 31, such as by injection molding. The actuator motor 80 includes a motor shaft 82 attached to the worm gear member 84 that engages the gear band SI of the actuation ring 66. Rotation of the gear band 81 by worm gear 84 causes rotation of the valve member 42 about central axis A.

The actuator motor 80 is electrically connected to a remotely located controller through an electrical circuit section 85 on a rear face of the actuator motor 80 using an electrical connector (not shown). The controller selectively signals the actuator motor 80 to rotate worm gear 84 and thereby to cause rotation of valve member 42. As shown in FIG. 2, the actuator motor 80 is secured to actuator motor housing 5 using fasteners 86 that engage threaded holes 87 located on a front face of actuator motor 80 and a rear cover plate 88 is installed over electrical section 85.

In operation, rotation of the valve member 42 selectively positions opening 44 to divert fluid flow from the pump cavity 50 to the first or the second fluid outlets 38, 39 or to both fluid outlets 38, 39 at the same time and thereby controlling the discharge of fluid from the pump section 4.

Figure 7C:
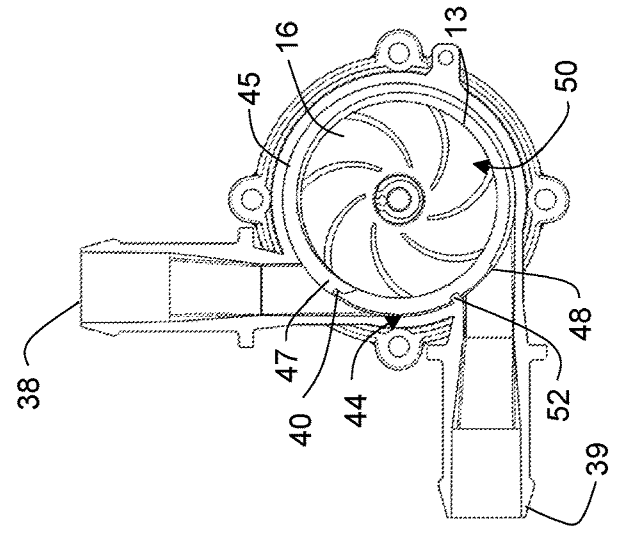
FIG. 7C illustrates a cross-sectional view of a portion of the pump assembly of the present disclosure, with the valve member in a third position.
Figure 7B:
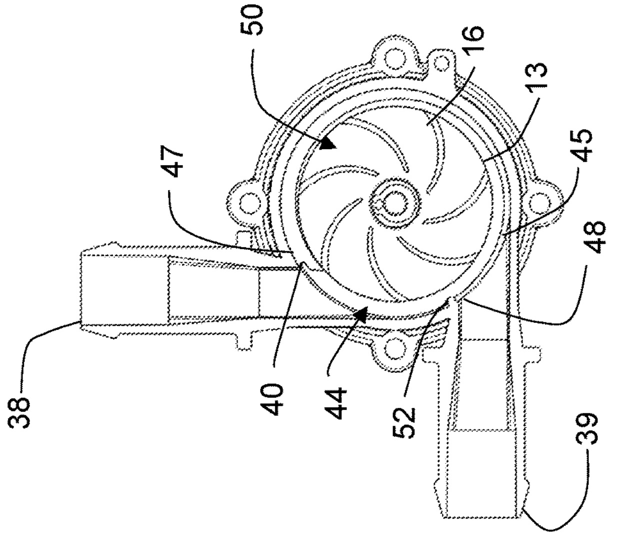
FIG. 7B illustrates a cross-sectional view of a portion of the pump assembly of the present disclosure, with the valve member in a second position.
Figure 7A:
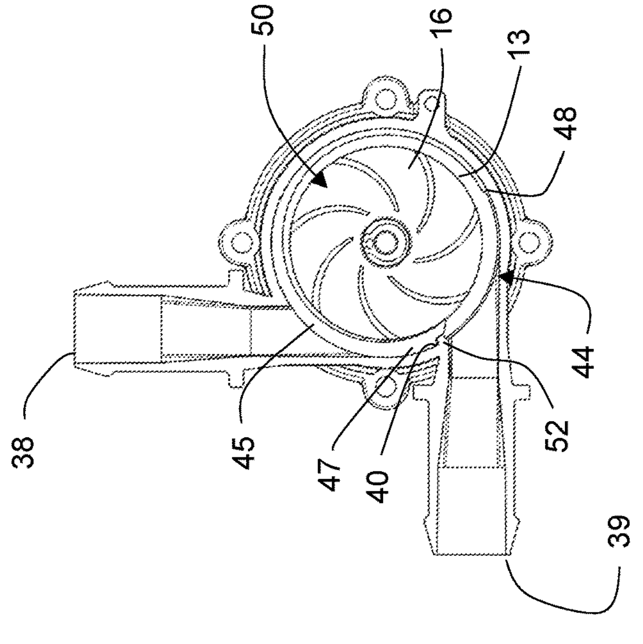
FIG. 7A illustrates a cross-sectional view of a portion of the pump assembly of the present disclosure, with the valve member in a first position.

Referring to FIGS. 7A-7C, the operation of the valve member 42 will now be explained. As is shown, the pump cavity 50 of the pump housing 31 includes impeller 16 rotating within valve member 42 driven by pump motor 10. The impeller 16 receives fluid from fluid inlet 36 through tubular portion 136 extending through cavity 57 of the valve member 42. The impeller 16 driving the fluid introduced into the pump cavity 50. In FIG. 7A the actuator 80 selectably rotates the actuation ring 66 of valve member 42 counter-clockwise to position the opening 44 into a first position that is in alignment with the second fluid outlet 39. Stop surface 40 located at the first end 47 of opening 44 engages and stops against stop member 52, providing a positive indication of the alignment of opening 44 with second fluid outlet 39. In the first position fluid driven by the impeller 16 is diverted entirely through the first fluid outlet 39. Wall 45 of the valve member 42 closing off and obstructing flow of the fluid to first fluid outlet 38.

In FIG. 7B, fluid is discharged from first fluid outlet 38 by the actuator 80 rotating actuation ring 66 of valve member 42 clockwise to a second position that aligns opening 44 with the first fluid outlet 38. In the second position an end portion of second end 48 of opening 44 engages and stops against stop member 52, providing a positive indication of the alignment of opening 44 with first fluid outlet 38. In the second position fluid driven by impeller 16 is directed entirely through the first fluid outlet 38. Wall 45 closing off and obstructing flow of the fluid to the second fluid outlet 39.

In FIG. 7C the actuator 80 selectably rotates the actuation ring 66 to position opening 44 in a third position located between the first fluid outlet 38 and the second fluid outlet 39, causing the fluid driven b the impeller 16 to be discharged from both fluid outlets 38 and 39. FIG. 7C shows the opening 44 in a location where fluid flow is shared between fluid outlets 38, 39. That is, in the third position, opening 44 causes approximately one-half of the fluid volume driven by impeller 16 to be output through first fluid outlet 38 and approximately the remainder one-half of the fluid volume through the second fluid outlet 39. It will h well understood by those skilled in the art that based on the location of the opening 44, other proportional output flow may be discharged from fluid outlets 38, 39. For example, the actuator 80 may selectably rotate actuation ring 66 to position opening 44 to direct 60 percent of the fluid flow through the first fluid outlet 38 and 40 percent through the second fluid outlet 39. Thus, by controlling the position of opening 44 not only does the valve member 42 selectively control from which fluid outlet fluid is discharged, but also the amount of fluid discharged from both fluid outlets 38, 39.

Turning now to FIG. 8 a cross-sectional view through the assembled pump housing 31 is shown. This view illustrates the valve member 42 mounted within the pump housing cavity 50. The impeller 16 is shown located within the valve member 42 resting above mounting plate 13. An annular skirt 165 having a centrally located cylindrical cavity 167 extends from the impeller 16 into the seal seat 19. The cavity 167 axially aligning with the mounting plate 13 opening 11. The internal diameter of the cavity 167 being slightly smaller than the exterior diameter of the motor shaft 12. Motor shaft 12 of pump motor 10 extends through opening 11 and is press-fit into cavity 167 attaching the impeller 16 to motor shaft 12. A steel spring 141 biases the annular elastomeric walls 142 against the skirt 165 that surround the motor shaft 12 making a fluid tight seal between walls 142 and the skirt 165 and preventing a potential infiltration of fluid from the pump cavity 50 from reaching the pump motor 10.

The pump housing 31 further includes an annular mounting cavity 150 extending internally in pump housing 31 defined by a wall 131. The mounting cavil 150 accepting therein the upper section 43 of valve member 42. The mounting cavity 150 includes an upper annular bearing surface 152 and a lower annular bearing surface 154. An upper portion of the valve member 42 interior surface 58 traversing against the upper bearing surface 152 and a lower portion of the valve member 42 interior surface 58 traversing against the lower bearing surface 154.

Mounting plate 13 further includes a shoulder 135 defined on an interior surface of wall 21 located circumferentially about mounting plate 13. A second shoulder 142 is molded circumferentially in the interior surface of the valve element 41. Shoulder 135 arranged to receive therein the first vane plate 161 and shoulder 142 arranged to receive therein the second vane plate 163 of impeller 16. The shoulders 135, 142 providing a bearing surface that stabilizes the rotation of the impeller 16.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," or "controller" within a claim is understood and intended to refer to structures known to those skilled in the relevant art, as further modified or enhanced by the features of the claims themselves and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A pump assembly comprising:
- a pump housing having a fluid inlet and at least one fluid outlet extending from the pump housing;
- an impeller for moving a fluid from the fluid inlet to the at least one fluid outlet;
- a motor for driving the impeller;
- a valve member rotatably mounted between the impeller and the at least one fluid outlet;
- an annular mounting cavity having a first and a second bearing surface; and
- an actuator motor housed in an actuator motor housing integrally formed with the pump housing arranged to rotate the valve member and selectively control the flow of the fluid through the at least one fluid outlet and the valve member to traverse on the first and the second bearing surfaces.

2. The pump assembly of claim 1, wherein the valve member includes:
- a valve element having an annular wall with at least one opening extending through the annular wall.

3. The pump assembly of claim 2, wherein the annular wall has an interior surface that is spirally voluted from a thicker wall section at a first end of the opening to a thinner wall section at a second end of the opening.

4. The pump assembly of claim 3, wherein the impeller is arranged to rotate inside the valve element voluted interior surface directing the flow of the fluid through the opening from the fluid inlet.

5. The pump assembly of claim 2, further comprising an actuation ring mounted to the valve member, the actuation ring causing movement of the valve member.

6. The pump assembly of claim 5, wherein the actuation ring includes:
- a gear band.

7. The pump assembly of claim 6, wherein the actuator motor includes: a worm gear engaged with the gear band, the actuator motor driving the actuation ring to rotate the valve member and the valve element.

8. The pump assembly of claim 7, wherein the at least one fluid outlet of the pump assembly includes:

a first fluid outlet and a second fluid outlet, the actuator motor selectively driving the valve member to rotatably move the valve element between a first position blocking the first fluid outlet with the annular wall and positioning the opening with the second fluid outlet and a second position blocking the second fluid outlet with the valve element wall and positioning the opening with the first fluid outlet.

9. The pump assembly of claim 8, wherein the valve member is rotatably movable to a third position positioning the opening between the first fluid outlet and the second fluid outlet.

10. The pump assembly of claim 8, wherein the pump housing further includes:

a stop member extending toward the valve element and the opening having a stop surface at a first end of the opening, wherein in the first position, the opening stop surface engages the stop member and in the second position, an end portion of the opening second end engages the stop member.

11. The pump assembly of claim 1, wherein the pump assembly includes:

a pump motor mounting plate attached to the pump motor, the pump motor mounting plate having a wall located circumferentially about the pump motor mounting plate and defining a first shoulder;

a second shoulder molded circumferentially on the interior surface of the valve element; and the impeller having a first vane plate and a second vane plate, wherein the first vane plate is fitted within the first shoulder and the second vane plate is fitted within the second shoulder.

12. A pump assembly comprising:

a pump housing having a fluid inlet and at least one fluid outlet extending from the pump housing;

an impeller for moving a fluid from the fluid inlet to the at least one fluid outlet;

a motor for driving the impeller;

a valve member rotatably mounted between the impeller and the at least one fluid outlet;

an annular mounting cavity having an upper bearing surface and a lower bearing surface; and the valve member further including an internal cavity defined by an interior surface, wherein an upper portion of the valve member interior surface rotatably traverses on the upper bearing surface and a lower portion of the valve member interior surface rotatably traverses on the lower bearing surface.

13. A pump assembly comprising:

a pump housing having a fluid inlet and at least one fluid outlet extending from the pump housing;

an impeller for moving a fluid from the fluid inlet to the at least one fluid outlet;

a motor for driving the impeller;

a valve member having an annular upper section defined by an interior surface and outer surface, the valve member rotatably mounted between the impeller and the at least one fluid outlet for selectively controlling the flow of fluid through the at least one fluid outlet;

an exterior sealing assembly located circumferentially about a perimeter of the upper section outer surface; and an interior sealing assembly located circumferentially about a perimeter of the upper section interior surface, the interior sealing assembly located parallel with the exterior sealing assembly.

14. The pump assembly of claim 11, wherein the pump assembly includes:

a motor shaft attached to the pump motor;

a seal seat formed in the pump motor mounting plate the seal seat having a seal member mounted in the seal seat; and a skirt extending from the impeller into the seal seat the skirt including a cavity arranged to receive the motor shaft and drive the impeller, wherein the seal member seals against the skirt.

15. A method of controlling the flow of a fluid from a pump assembly that includes a pump housing having a fluid inlet and at least one fluid outlet extending from the pump housing, the method comprising:

moving a fluid from the fluid inlet to the at least one fluid outlet using an impeller;

driving the impeller with a motor;

providing an actuator motor housed in an actuator motor housing integrally formed with the pump housing;

rotatably mounting a valve member between the impeller and the at least one fluid outlet in a mounting cavity the mounting cavity having first and second bearing surfaces; and selectively moving the valve member to control the flow of the fluid through the at least one fluid outlet and the valve member to traverse on the first and second bearing surfaces.

16. The method of claim 15, wherein selectively moving the valve member includes positioning at least one opening of the valve member into a position between the impeller and the at least one fluid outlet to control the fluid flow through the at least one fluid outlet.

17. The method of claim 15, wherein selectively moving the valve member includes using the actuator motor to rotate the valve member.

18. The method of claim 16, wherein the valve member includes an annular wall that is spirally voluted from thicker wall section at a first end of the opening to a thinner wall section at a second end of the opening.

19. The method of claim 18, wherein the impeller is arranged to rotate inside the valve member annular wall.

20. The method of claim 17, wherein selectively moving the valve member by the actuator motor rotates the valve member in a counterclockwise or a clockwise direction.

* * * * *